United States Patent
Ionescu (10) Patent No.: US 6,741,658 B1
(45) Date of Patent: May 25, 2004

(54) APPARATUS, AND ASSOCIATED METHOD, FOR FORMING A SIGNAL FOR COMMUNICATION UPON A FADING CHANNEL

(75) Inventor: Dumitru Mihai Ionescu, Dallas, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/474,215

(22) Filed: Dec. 29, 1999

(51) Int. Cl.⁷ .............................. H04B 7/02; H04B 7/10
(52) U.S. Cl. ........................................ 375/267; 375/347
(58) Field of Search .................. 375/267, 263, 375/347, 340, 349; 341/106, 174

(56) References Cited

U.S. PATENT DOCUMENTS

| | | | | |
|---|---|---|---|---|
| 5,321,725 A | * | 6/1994 | Paik et al. | 375/265 |
| 5,784,417 A | * | 7/1998 | Alamouti | 375/341 |
| 6,031,474 A | * | 2/2000 | Kay et al. | 341/106 |
| 6,088,408 A | * | 7/2000 | Calderbank et al. | 375/347 |
| 6,473,878 B1 | * | 10/2002 | Wei | 714/755 |

OTHER PUBLICATIONS

Ionescu D M: "New results on space–time code design criteria" WCNC. 1999 IEEE Wireless Communications and Networking Conference, vol. 2, Sep. 21–24, 1999, pp. 684–687, XP002166542.

Van Wyk D J et al: "On the construction of layered space-time coded modulation (STCM) codes employing MTCM code design techniques" IEEE VTS 50$^{th}$ Vehicular Technology Conference, vol. 5, Sep. 19–22, 1999, pp. 2969–2973, XP002166543.

Tarokh et al: "Space–time block codes from orthogonal designs" IEEE Transactions on Information Theory, vol. 45 No. 5, Jul. 1999, pp. 1456–1467 XP002161393.

Grimm J et al: "Further Results on Space–Time Coding for Rayleigh Fading" Proceedings of 36$^{th}$ Annual Allerton Conference on Communication, Control and Computing, Sep. 23–25, 1998, pp. 391–400, XP00874797.

Da Silva F A et al: "Using space–time TCM with rotated constellations for transmission over mobile communications channels" Electronics Letters, vol 35, No. 6, Mar. 18, 1999, pp. 454–456, XP002166554.

* cited by examiner

*Primary Examiner*—Khai Tran
(74) *Attorney, Agent, or Firm*—Federico Fraccaroli (57) ABSTRACT

A method, and associated apparatus, for a sending station operable in a communication system, such as a cellular communication system. A codeword is formed which, when transmitted upon a channel, exhibits a selective level of space and time diversity. A TCM (Trellis Coded Modulation) scheme is provided for a multiple-antenna transmitter which accommodates transmit diversity by way of the multiple antennas without requiring the need to utilize multiple Trellis Coded Modulation techniques.

6 Claims, 5 Drawing Sheets

| CODEWORD | E.V=2 | E.V=4 | E.V=6 | E.V=8 |
|---|---|---|---|---|
| 0 | 1.3.4.12 | 2.5.7.8.13.15 | 6.9.11.14 | 10 |
| 10 | 6.9.11.14 | 2.5.7.8.13.15 | 1.3.4.12 | 0 |
| 2 | 1.3.6.14 | 0.5.7.10.13.15 | 4.9.11.12 | 8 |
| 8 | 4.9.11.12 | 0.5.7.10.13.15 | 1.3.6.14 | 2 |
| 5 | 1.4.6.9 | 0.2.7.8.10.13 | 3.11.12.14 | 15 |
| 15 | 3.11.12.14 | 0.2.7.8.10.13 | 1.4.6.9 | 5 |
| 7 | 3.4.6.11 | 0.2.5.8.10.15 | 1.9.12.14 | 13 |
| 13 | 1.9.12.14 | 0.2.5.8.10.15 | 3.4.6.11 | 7 |

*FIG. 4*

| CODEWORD IN S | EQUIVALENT QPSK IMPLEMENTATION |
|---|---|
| $C_0$ | $\begin{bmatrix} 1 & 3 \\ 0 & 0 \end{bmatrix}$ |
| $C_1$ | $\begin{bmatrix} 1 & 2 \\ 1 & 0 \end{bmatrix}$ |
| $C_2$ | $\begin{bmatrix} 1 & 1 \\ 2 & 0 \end{bmatrix}$ |
| $C_3$ | $\begin{bmatrix} 1 & 0 \\ 3 & 0 \end{bmatrix}$ |
| $C_4$ | $\begin{bmatrix} 0 & 3 \\ 0 & 1 \end{bmatrix}$ |
| $C_5$ | $\begin{bmatrix} 0 & 2 \\ 1 & 1 \end{bmatrix}$ |
| $C_6$ | $\begin{bmatrix} 0 & 1 \\ 2 & 1 \end{bmatrix}$ |
| $C_7$ | $\begin{bmatrix} 0 & 0 \\ 3 & 1 \end{bmatrix}$ |
| $C_8$ | $\begin{bmatrix} 3 & 3 \\ 0 & 2 \end{bmatrix}$ |
| $C_9$ | $\begin{bmatrix} 3 & 2 \\ 1 & 2 \end{bmatrix}$ |
| $C_{10}$ | $\begin{bmatrix} 3 & 1 \\ 2 & 2 \end{bmatrix}$ |
| $C_{11}$ | $\begin{bmatrix} 3 & 0 \\ 3 & 2 \end{bmatrix}$ |
| $C_{12}$ | $\begin{bmatrix} 2 & 3 \\ 0 & 3 \end{bmatrix}$ |
| $C_{13}$ | $\begin{bmatrix} 2 & 2 \\ 1 & 3 \end{bmatrix}$ |
| $C_{14}$ | $\begin{bmatrix} 2 & 1 \\ 2 & 3 \end{bmatrix}$ |
| $C_{15}$ | $\begin{bmatrix} 2 & 0 \\ 3 & 3 \end{bmatrix}$ |

APPARATUS, AND ASSOCIATED METHOD, FOR FORMING A SIGNAL FOR COMMUNICATION UPON A FADING CHANNEL

The present invention relates generally to the communication of data upon a channel susceptible to fading, such as a radio channel upon which data is transmitted during operation of a cellular communication system. More particularly, the present invention relates to apparatus, and an associated method, by which to increase the transmission diversity of the data communicated upon the channel, thereby to facilitate the recovery of the data once received at a receiving station.

A variant of a TCM (Trellis Coded Modulation) scheme is provided which provides for both spatial and time redundancy when used at a multiple antenna transmitter.

BACKGROUND OF THE INVENTION

The use of wireless communication systems has achieved wide popularity in recent years as a result of advancements in communication technologies. Multi-user, wireless communication systems of improved capabilities are regularly utilized by large numbers of consumers to communicate both voice and nonvoice information.

In a wireless communication system, a communication channel formed between a sending station and a receiving station is a radio channel defined upon a portion of the electromagnetic spectrum. Because a radio channel forms a communication link between the sending and receiving stations, a wireline connection is not required to be formed between the sending and receiving stations to permit the communication of data between the stations. Communication by way of a wireless communication system is thereby permitted at, and between, locations at which the formation of a wireline connection would not be practical. Also, because a communication channel is formed of a radio channel, a radio communication system can be more economically installed as the infrastructure costs associated with a wireline communication system are significantly reduced.

A cellular communication system is exemplary of a wireless, multi-user radio communication system which has achieved wide levels of usage and which has been made possible due to advancements in communication technologies. A cellular communication system is typically formed of a plurality of fixed-site base stations installed throughout a geographical area which are coupled to a PSTN (Public-Switched, Telephonic Network). Portable transceivers, typically referred to as mobile stations, mobile terminals, or cellular phones, communicate with the base stations by way of radio links.

A cellular communication system efficiently utilizes the portion of the electromagnetic spectrum allocated thereto. Because of the spaced-apart positioning of the base stations, only relatively low-power signals are required to effectuate communications between a base station and a mobile station. As a result, the same frequencies can be reused at different locations throughout the geographical area. Thereby, communications can be effectuated between more than one set of sending and receiving stations concurrently at separate locations throughout the area encompassed by the cellular communication system.

In an ideal communication system, a communication signal, when received at a receiving station, is substantially identical to the corresponding communication signal when transmitted by a sending station. However, in a non-ideal communication system in which the communication signal must be transmitted upon a non-ideal communication channel, the signal, when received at the receiving station, is dissimilar to the corresponding communication signal when sent by the sending station. Distortion of the communication signal caused by transmission of the communication signal upon the communication channel causes such dissimilarities to result. If the distortion is significant, the informational content of the signal cannot be recovered at the receiving station.

The communication channel might be of characteristics which distort the value of the information bearing bits conveyed by a communication signal. Fading, such as that caused by multi-path propagation, or Rayleigh fading, alters the communication signal during its transmission. Such distortion, if not corrected, reduces the communication quality levels in a communication session formed between a sending and receiving station.

Various techniques are utilized to overcome distortion introduced upon a communication signal as a result of transmission upon a non-ideal communication channel.

Time encoding of the communication signal, prior to its transmission, for instance, increases the redundancy of the transmitted signal. By increasing the time redundancy of the signal, the likelihood of the informational content of the signal being recoverable, once received at the receiving station, is increased. Increasing the time redundancy of a signal is sometimes referred to as creating time diversity.

Also, space diversity is sometimes also utilized, for transmission of communication signals. Typically, space diversity refers to the utilization of more than one transmit antenna transducers from which a communication signal is transmitted, thereby to provide spatial redundancy. The two antennas must be separated enough to insure that their signals fade in an uncorrelated fashion. The use of space diversity does not have to be separated from encoding in the time domain. When space and time diversity are used together, the encoding in the time domain should be done jointly, across the different antenna transducers, in order to efficiently combine the two forms of diversity.

Combinations of both space and time coding further enhances transmission diversity to combat signal fading caused by multi-path transmission. At any symbol epoch, exactly one symbol is transmitted from each transmit antenna. Each transmitted symbol is selected from the constellation of signal points that characterizes the modulator associated with a particular antenna. Note that the constellations pertaining to the different transmit antennas can be in general different, but in practice it may be preferable to have identical signal constellations for all transmit antennas. The particular constellation points selected to be sent over the different transmit antennas during an arbitrary (multiple) transmission are appropriately determined from the encoder's output symbols. Trellis encoding is sometimes used to effectuate space time coding. But, block coding is valid, too. In the former case, the selection of the constellation points, starting from the encoder's output symbols, is decided by a construction, referred to as a trellis, which describes all possible transitions between a given, finite number of states. The states are tuples of certain most recent symbols, e.g., bits, applied to the input of the trellis encoder. For example, if the input sequence consists of raw information bits, then the tuples reflect the most recent past history of the information bit sequence which is provided to the trellis encoder, and the trellis describes a transformation of an input sequence of bits, into an output sequence of symbols, referred to as a coded symbol sequence. Note that the coded symbols can be nonbinary, too. The trellis is represented by successive columns, referred to as states, and transitions between states of successive columns are referred to as transitions. Each branch corresponds to a particular combination of new input symbols while in a given state. A mapper is utilized to map each coded symbol to a signal constellation point, thus determining the modulation parameters for a carrier signal.

In construction of the trellis and the mapper, a significant goal is to optimize the manner by which labels to trellis branches are assigned and to optimize the manner by which constellation points are assigned to the symbols used in the trellis branch labels. The optimality of the assignment is characterized in terms of a measure, referred to as a distance between two different codewords. The distance, ultimately, is determinative of the physically-meaningful, probability of a receiving station mistaking one codeword for another. The smaller the probability of a mistake, the better shall be the performance of a space-time code that is utilized in the effectuation of the communication. In order to ensure as large of a distance as possible between two codewords, a succession of points selected, during transmission, from the signal constellation, as dictated by the trellis, must be carefully determined during initial construction of the trellis. One approach to doing this is to maximize the minimum among all possible distances between pairs of transmitted codewords. To do this, codes are selected whose trellises have as large as possible pair wise distances between codewords. But, the distance spectrum is important too; it may be acceptable to allow a smaller minimum distance if that distance occurs very seldomly.

A set of all signals that possibly can be selected for transmission upon a multiple number of transmit antennas, within a meaningful time interval and according to all possible patterns of input symbols, forms a space-time code. Subsequent to constructing the space-time code, the space-time code is implemented as an encoder at a sending station and as a decoder at a receiving station. A significant problem is to determine a manner by which to efficiently select points from a given signal constellation, in such a manner as to optimize an overall performance of the transmission scheme. Performance is defined, for instance, in terms of a Bit Error Probability (BEP).

Conventionally, however, space-time coding is not optimized. This is because incorrect distance measures are utilized in trellis construction, in order to tentatively optimize the codeword separation by properly selecting points from the signal constellations used by the modulators associated with all of the transmit antennas. Note that these constellations can be in general different but in practice it may be preferable to have identical signal constellations for all transmit antennas. Conventionally, a metric suitable for space-time code design is not properly identified. Typically, a distance measure is selected based upon convenience and result in incomplete criteria of code design. The determinant criterion and the maximum rank criterion are conventionally the criteria utilized in space time code design. The former is nonconstructive and the latter only copes with the achievable level of transmit diversity.

Finally, note that while the selection of points from the signal constellations of the transmit antennas can be done via a trellis, this is not the only possibility.

If a manner could be provided by which to better jointly encode across the multiple transmit antennas, improved communication quality in a communication system in which data must be communicated upon a channel susceptible to fading would result.

Traditionally, TCM has been devised and tentatively perfected for systems using one transmit antenna. This is an important differentiator from the multiple antennas needed when coding with both space and time redundancy. Note that, in general, TCM schemes designed for Gaussian channels perform poorly in fading; likewise, trellis codes designed specifically for fading channels fail to perform well in Gaussian channels. In an attempt to deal with trellis codes for fading channels, people even considered doing away with the TCM concept.

As opposed to the one transmit antenna case, the presence of more than one transmit antenna allows for diversity even in Rayleigh fading (flat fading for each individual antenna). This should change the approach decoding because, as diversity is taken advantage of at the receiver, the fading is smoothed out and the resulting signal behaves more like having passed through a Gaussian channel. Note that this was not the case with one transmit antenna and flat fading, in the absence of other sources of diversity. Therefore, when coding with both space and time redundancy, it is desirable to have a code design that performs well not only in fading but also in Gaussian channels. The simple presence of spatial diversity changes the code design problem considerably, a fact that has not been taken into consideration so far.

It is in light of this background information related to communication of data upon a channel susceptible to fading that the significant improvements of the present invention have evolved.

SUMMARY OF THE INVENTION

The present invention, accordingly, advantageously provides apparatus, and an associated method, by which to increase the transmission diversity of data communicated upon a communication channel susceptible to fading. By increasing the transmission diversity of the data, recovery of the data, once received at a receiving station, is facilitated.

In one aspect of the present invention, a modulator is provided for a sending station operable to send a communication signal representative of the data to be communicated. The modulator is constructed in such a manner as to constrain a sequence of transmitted constellation points to behave in a desired fashion. Through operation of an embodiment of the present invention, optimal space-time codes are determinable, when optimal space-time codes exist. And, if optimal space-time codes do not exist, a suboptimal space-time code is determinable. Through such determination, the receiving station is best able to recover the informational content of a communication signal received thereat.

In operation, a natural distance measure is first identified between two codewords and thereafter is used to characterize the set of all codeword difference matrices responsive thereto. For any arbitrary pair of codewords e and c, a codeword difference matrix $D_{ec}$ is formed. The difference matrix is formed by performing a component-wise difference between the two codewords and arranging the results in rows and columns; for example, the columns correspond to the transmit antennas and the rows to the time epochs. In an embodiment in which two antenna transducers are used to provide space diversity, the results are arranged in two columns, one column for each of the antenna transducers. And, the distance criterion used to characterize the set of all codeword difference matrices maximizes the minimum distance between any two codewords amongst all of the possible pairs of codewords. The natural definition of the square of the distance between any two codewords is the sum of all eigenvalues of a square matrix formed of the product of the Hermitian of a code difference matrix multiplied together with the code difference matrix. The result is a true distance measure of Euclidean type that verifies all of the axioms of a metric. Additionally, the distance squared exhibits an additive property which permits simplification of the computation of a distance spectrum. And, the pairwise error probability (PEP) of any two codewords is maximized if and only if the resultant product matrix is diagonal and its eigenvalues are equal and as large as possible. That is to say, the PEP between the codewords is maximized if the resultant product matrix is diagonal and all diagonal elements of the resultant product matrix are equal. The codes that satisfy these criteria are optimal, as they achieve minimal pairwise (codeword) error probability on the average, and thereby lower the possible average BEP. If these conditions are impossible to be met for a particular signal constellation and a particular number of transmit antennas, the best suboptimal codes are those for which the resultant product matrix is as close to diagonal as possible and the diagonal element of such metric are as close to each other in value as possible. This condition is more general and applies in more general contexts than modulators whose signal points are taken from the complex field. E.g., the modulator could be an algebra of dimensionality higher than 2.

In one implementation, a modulator is provided for a transmitter portion of a mobile station operable in a cellular communication system. Analogous structure also forms portions of transmitter circuitry of a base station operable in a cellular communication system. The modulator is operable to map encoder output symbols applied to the modulator into modulator output symbols wherein the modulator output symbols form codewords. When a code difference matrix, formed between any arbitrary two codematrices, is multiplied on the left by its Hermitian, the product matrix is diagonal and all its diagonal elements are equal, thereby ensuring that the distance between any two codewords is made as large as possible.

In another aspect of the present invention, a TCM (Trellis Coded Modulation) scheme is provided for a multiple antenna transmitter. The TCM scheme provides a novel manner by which to impart optimality to the coding used to provide both spatial and time redundancy thereby extending the classical TCM scheme to form what is referred to herein as EDTCM (Enhanced modulator Dimensionality Trellis Coded Modulation). The EDTCM scheme provides good spectral efficiency by accommodating transmit diversity by way of multiple transmitted antennas and behaves optimally in both fading and AWGN (Average White Gaussian Noise) channels, while simultaneously achieving full transmit diversity and the maximum achievable modulator rate thereby.

In one implementation, the individual antenna constellations are combined, used on each of the multiple antennas are combined into one overall, equivalent, super-constellation of points. The resultant super-constellation achieves both full transmit diversity and the largest achievable modulator rate thereof. Optimal use of transmit diversity by implicit diversity-combining at a receiving station is also facilitated by the scheme under discussion. A piecewise construction is performed over some fixed number, less than the frame length, of consecutive channel signal epochs at a time, and then extended in a piece-wise manner to an entire frame, while preserving optimality in both fading and AWGN channels. The piece-wise construction also permits handling of fast fading conditions. The admissible coherence time is the maximum between the number of consecutive epochs and the estimation time of a channel estimator. By enhancing the modulator dimensionality through the use of a super-constellation, the distance properties of the modulator are improved.

In these and other aspects, therefore, a modulator, and an associated method, is provided for a sending station operable in a radio communication system in which the sending station is operable to send data upon a communication channel susceptible to fading to a receiving station. The modulator includes a mapper coupled to receive a group of encoder output symbols in which the encoder output symbols are encoded representations of the data to be communicated upon the communication channel. The mapper maps the group of encoder output symbols to at least a first sequence of modulator input symbols. The at least first sequence of modulator output symbols is formed of at least one symbol. And, the at least first sequence of modulator output symbols forms a codeword such that a Hermitian of a difference matrix formed between an arbitrary pair of codewords multiplied by the difference matrix forms a diagonal product matrix having all diagonal elements equal to each other.

In these and other aspects, also therefore, a method, and an associated apparatus, forms a codeword which, when transmitted upon a communications channel makes efficient use of (1.) the forms of diversity present in the system, through space and time redundancy and (2.) of the noise statistics. A super-constellation of points is formed. The points of the super-constellation are selected to exhibit, when assembled together to form a codeword and transmitted upon the channel, a selected level of space diversity. The points of the superconstellation when assembled together to form a codeword and transmitted upon the channel, are preferably also selected to maximize the product distance (PD). The PD is the product of eigenvalues of $D_{ec}{}^{H}D_{ec}$. The super-constellation is partitioned into at least two subsets of points. The points of each subset into which the super-constellation is partitioned are selected to be maximally spaced with respect to Euclidean distance.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
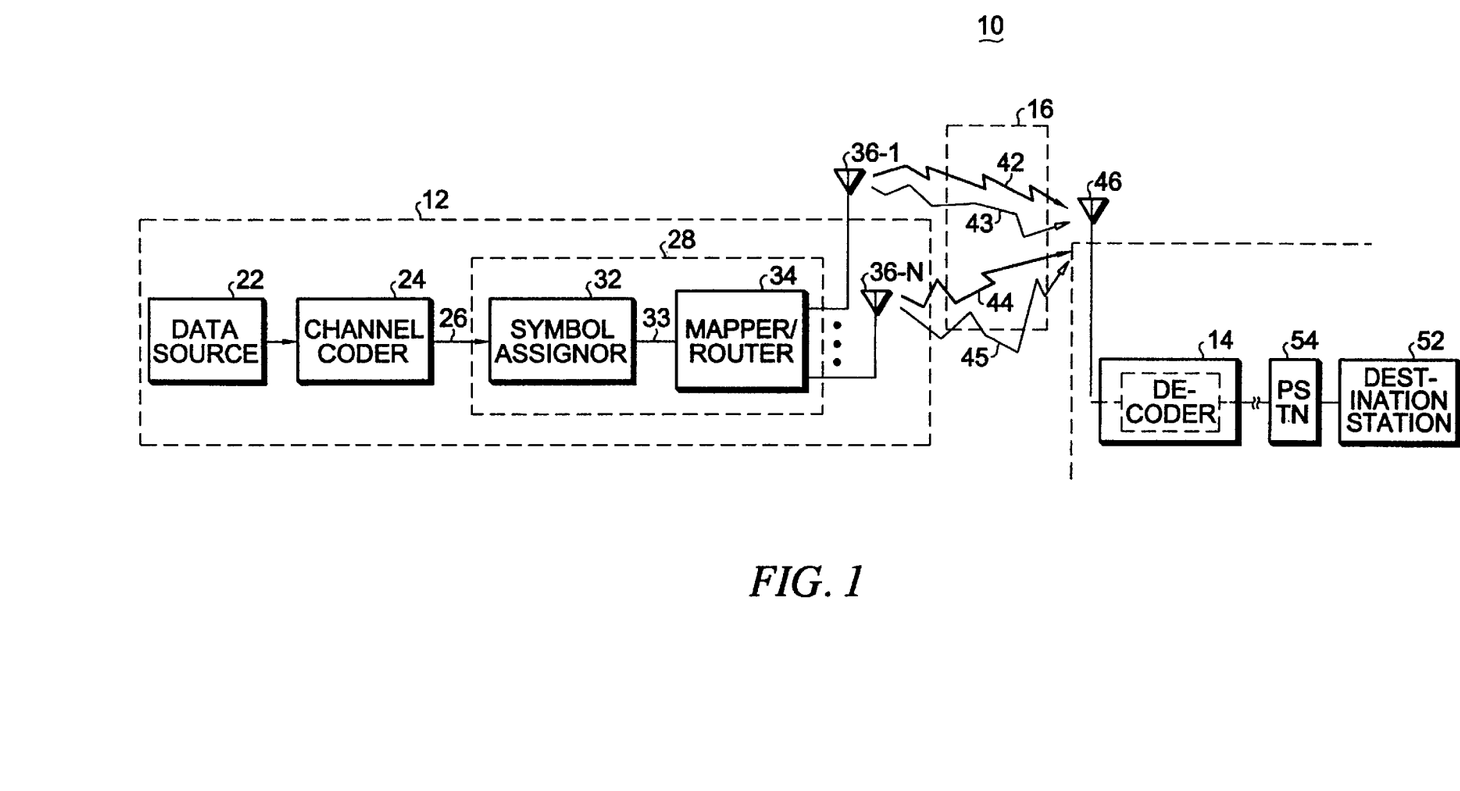
FIG. 1 illustrates a functional block diagram of a communication system in which an embodiment of the present invention is operable.

Referring first to FIG. 1, a communication system, shown generally at 10, is operable to communicate data between a sending station 12 and a receiving station 14 by way of a communication channel 16. The sending station uses at least one transmit antenna, in such a manner as to insure that the signals from all transmit antennas are mutually uncorrelated. Likewise, the receiving station uses at least one receive antenna. The communication channel is susceptible to fading, or somehow requires channel encoding across all transmit antennas. A wireless channel with multipath propagation is sometimes referred to as a fading channel.

The communication system 10 is representative of a cellular communication system in which, for example, the sending station 12 forms the transmit portion of a mobile station and the receiving station 14 forms the receive portion of a base station system. While the following description of the exemplary implementation shall be carried out with respect to an implementation in which the sending station 12 forms the transmit portion of a mobile station and the receiving station 14 forms the receive portion of a base station system, the sending and receiving stations 12 and 14 are analogously also representative of the transmit and receive portions, respectively, of the base station system and mobile stations operable in a cellular communication system. The following description, therefore, could similarly instead be carried out with respect to such operation. And, the sending and receiving stations are also representative of the sending and receiving stations operable in other types of communication systems, both wireline and non-wireline in which communication is realized over one or more parallel uncorrelated channels. An embodiment of the present invention is analogously also operable in such other types of communication systems.

The sending station 12 is here shown to include a data source 22 which sources the data which is to be communicated by the sending station to the receiving station. The data source, for instance, comprises voice data generated by a user of the mobile station of which the sending station is a part. The data source 22 is also representative of nonvoice data, such as that generated by a processing device. When a voice signal forms the data generated by the data source, appropriate processing circuitry, e.g., for source encoding, is utilized to convert the voice signal into digital form.

Data generated by the data source 22 is applied to a channel coder 24. The channel coder is operable to encode the data applied thereto according to a selected encoding scheme. The encoding scheme encodes the data applied thereto in order to increase the information redundancy, thereby to create time diversity. The channel coder generates encoder output symbols on the line 26. Each encoder output symbol formed by the channel coder occupies a time period, herein referred to as the (channel) encoder output symbol epoch.

The encoder output symbols are applied to a modulator 28, here shown to include a symbol assign or 32 and a mapper/router 34. After applying one or more encoder output symbols to the symbol assign or, exactly one constellation point is selected, for simultaneous transmission, from each of the signal constellations pertaining to all of the transmit antennas in each symbol epoch. The selection is indicated via indices that point to the appropriate modulation parameter values, according to the corresponding modulation schemes used by all of the transmit antennas. In the exemplary implementation, a QPSK (Quaternary Phase Shift Keying) modulation scheme is utilized, and the correct number of encoder output symbols are assigned, per transmission, to one of four constellation points defined in the QPSK constellation.

The modulator symbols to which the encoder output symbols are assigned are applied to the mapper 34. The mapper 34 is operable, pursuant to an embodiment of the present invention, to map the symbols applied thereto to a set of one or more antenna transducers 36. In the implementation shown in the figure, the set of antenna transducers includes n antenna transducers 36-1 through 36-n. The mapper 34 is operable to map selected ones of the symbols applied thereto through corresponding selected ones of the antenna transducers 36-1 through 36-n. Conventional sending-station circuitry positioned between the modulator 28 and the antenna transducers, such as amplification elements and up-conversion elements, are not shown in the figure, for purposes of simplicity.

Each antenna transducer 36-1 through 36-$L_t$ is operable to transduce, into electromagnetic form, the symbols provided thereto, thereby to transmit the symbols upon the communication channel to the receiving station 14. Paths 42 and 43 are illustrated in the figure, pertaining to the antenna transducer 36-1. Such paths are representative of multiple paths conveying the electromagnetic signals transmitted to the receiving station. Because of the multiple, distinct, transmission paths that convey the communication signals, the signal from each antenna transducer is susceptible to fading. The fading experienced by the signals from different antenna transducers lacks mutual correlation; that is to say, the fading processes affecting the signals from different antenna transducers are uncorrelated with one another.

The signals transmitted upon the paths 42 and 44 are sensed by an antenna transducer 46 which forms a portion of the receiving station 14. In the exemplary implementation, a single antenna transducer is utilized. The receiving station, in an alternate implementation, includes more than one antenna transducer. The antenna transducer is operable to convert the electromagnetic signals received thereat into electrical form and to provide the electrical signals to receiver circuitry of the receive portion of the receiving station. The receive circuitry includes a decoder 48 which is operable to decode symbols applied thereto, in a manner operable generally reverse to that of the channel coder 24. Additional circuitry of the receiving station is not separately shown and is conventional in nature. In an implementation in which the receiving station 14 forms the receive portion of a base station system, once the signal is operated upon by the receiving station 14, representative signals are provided to a destination station 52, here by way of a PSTN (Public-Switched, Telephonic Network) 54.

In operation, the encoder output symbols, once assigned by the symbol assign or 32, are applied by way of the line 33 to the mapper 34. The assign or is operable to verify an Orthogonality Condition (OC) of the encoder output symbols to ensure that both the transmission, or space, diversity and the time diversity, derived from encoding across all transmit antennas, are optimized jointly. A codeword, c, is defined to be formed of symbols applied to the mapper 34 and is represented mathematically as follows:

$$c = \left[ c_k^{(1)} c_k^{(2)} \ldots c_t^{(L_t)} c_{k+1}^{(1)} c_{k+1}^{(2)} \ldots c_{k+1}^{(L_t)} \ldots c_{k+l-1}^{(1)} \ldots c_{k+l-1}^{(L_t)} \right]^T$$

$$= [c_k^T, \ldots, c_{k+l-1}^T]^T$$

wherein:

$L_t$ is the number of transmit antenna transducers 36-1 through 36-$L_t$, i.e., the number of antenna transducers of which the set of antenna transducers 36 is formed;

l is the length of a block of modulator symbol epochs over which encoding is performed jointly across all of the transmit antennas;

k is a discrete time instant at which a block of jointly encoded (across all transmit antennas) modulator output symbols commence; and $c_k^{(i)}$ is the complex symbol from the complex signal constellation pertaining to the i-th antenna transducer, assigned by the symbol assign or 32 to be transmitted at time instant k over antenna transducer 36-i.

Herein, we assume $l \geq L_t$; otherwise the product $D_{ec}^H D_{ec}$ discussed in the sequel should be replaced by $D_{ec} D_{ec}^H$.

The codeword c is also represented in matrix form as a code-matrix $D_{c,k}$ as follows:

$$D_{c,k} = \begin{bmatrix} c_k^{(1)} & c_k^{(2)} & \ldots & c_k^{(L_1)} \\ c_{k+1}^{(1)} & c_{k+1}^{(2)} & \ldots & c_{k+1}^{(L_1)} \\ \vdots & \vdots & \ddots & \vdots \\ c_{k+l+1}^{(1)} & c_{k+l+1}^{(2)} & \ldots & c_{k+l+1}^{(L_1)} \end{bmatrix}$$

wherein the elements are defined as above.

Each column of the matrix indicates complex symbols applied to a separate antenna. That is to say, the first column indicates complex symbols applied to a first antenna, the second column indicates complex symbols applied to a second antenna, and the $L_t$th column indicates symbols applied to the $L_t$th antenna. And, as indicated by the matrix k+l−1 symbols are applied to each antenna during a jointly encoded block of modulation symbols. The matrix shown above is the code-matrix representation of a codeword c. A corresponding code-matrix can be found to represent another codeword, such as codeword e. Also, a codeword difference matrix $D_{ec}$ is formed by taking a component-wise difference between the codematrices $D_e$ and $D_c$ in which the difference matrix is also represented by columns and rows of complex symbol, also one column per antenna transducer.

The Orthogonality Condition is satisfied if for all pairs of codewords c, e, the Hermitian $D_{ec}^H$ of the code difference matrix $D_{ec}$, multiplied on the right by the code difference matrix $D_{ec}$ itself, forms a product matrix which is diagonal, with all its diagonal elements being equal. When this Orthogonality Condition is satisfied, the rank of $D_{ec}$ is maximal, thereby ensuring maximization of the transmit diversity level imparted on the transmitted signals altogether.

One way to guarantee the OC over the whole codeword/frame length of l modulator (or channel) symbol time epochs is by implementing it in a piece-wise manner, i.e., over l'<l (channel) symbol time epochs at one time, l'≧2. If we choose l' such that l' divides $L_t$, then the l×$L_t$ matrix $D_{ec}$ can be viewed as a block, ($L_t$/l')×1 matrix [or tensor, or matrix whose components are l'×$L_t$ (sub)matrices], the matrix multiplication $D_{ec}^H D_{ec}$ can be performed block wise and a sufficient condition for $D_{ec}$ to fully comply with the OC can be easily shown to be that the l'×$L_t$ submatrices of $D_{ec}$ do.

Second, the implementation of the OC, over l'<l (channel) symbol time epochs at one time, can be realized by using the Radon-Hurwitz construction developed as a solution to the Radon-Hurwitz problem but need not be limited to the Radon Hurwitz construction. When a Radon-Hurwitz transform of size l'×$L_t$ exists, the l'×$L_t$ submatrices of the l'×$L_t$ matrix $D_{ec}$ will be Radon-Hurwitz constructions, each of size l'×$L_t$. When l'=$L_t$ and the constellations are complex, square Radon-Hurwitz constructions exist only for l'=$L_t$=2.

Non-square constructions are also possible. However, some non-square constructions may result in modulator rates smaller than the maximum rate achievable simultaneously with full diversity. The Radon-Hurwitz transformation facilitates the construction of a particular type of space-time codes for two transmit antennas ($L_t$=2). However, it remains just a particular means of implementing the OC. The OC proves to be, along with the claims to follow, more general than the particular instances of a space time code obtained via the above mentioned transformation. When l'>$L_t$, l' is a multiple of $L_t$ and a Radon Hurwitz construction exists for size $L_t$×$L_t$, then the l'×$L_t$ Radon Hurwitz submatrix construction can be realized by an extension of the $L_t$×$L_t$ construction. Other choices, as well as modulator rate tradeoffs, are possible and even search methods can be used to find particular nonsquare constructions. The piece-wise implementation of the OC for $L_t$=2 and l'=2, i.e., via the 2×2 complex, square submatrix, Radon-Hurwitz construction is possible.

The piece-wise implementation of the OC also relaxes the assumption made in its derivation, i.e., that fading be constant over the entire codeword/frame length of l time epochs. Now constant fading coefficients are needed only over l'<l epochs instead of l time epochs, e.g., for l'=2 the fading must be constant only over two adjacent transmissions.

The set of all codematrices compliant with the OC is regarded to be a super-signal constellation which, in turn, describes a generalized, or enhanced, modulator. This modulator guarantees maximum diversity, has the maximum rate (in bits/s/Hz) that can be achieved simultaneously with maximum transmit diversity, exhibits an inherent coding gain in a certain sense, and can be regarded as a signal constellation of higher dimensionality.

The relevant distance between codematrices is still the Euclidian distance, rather than the so-called product distance (in fact a pseudo-distance). Now the isomorphism between codematrices and vectors of dimension l'×$L_t$ and the fact that the Euclidian distance between code matrices is preserved by the isomorphism can be used. The code design must guarantee that during any transition through the trellis the points that can be possibly selected are maximally separated. The simple case $L_t$=2 and l'=2 serves also as an example for the realizability of the OC.

In the exemplary implementation shown in FIG. 1, the sending station includes two antenna transducers 36 and the symbol assign or 32 is operable pursuant to a QPSK modulation scheme.

We stress that the construction to follow is just a particular means of implementing the OC, which is more general as a method. We were able to prove that the OC characterizes optimality for space time coding in a general sense. Apart from proving the realizability of the OC, the following construction describes only a particular embodiment.

Figure 2:
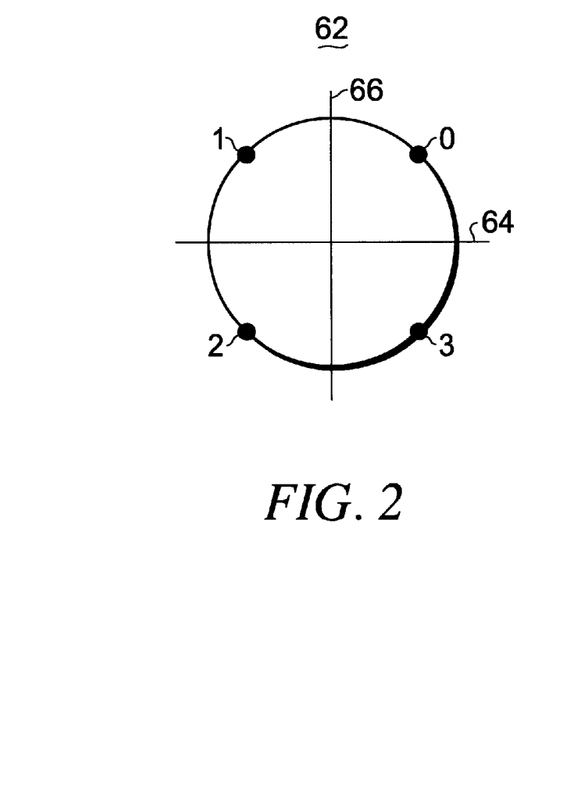
FIG. 2 illustrates a graphical representation of a possible constellation set to be used by an individual antenna and into which encoded information symbols are mapped by a symbol assign or which forms a portion of the communication system shown in FIG. 1.

FIG. 2 illustrates the signal constellation for a QPSK modulator, with 62 illustrating the complex values used in a QPSK modulation scheme. Four symbols, identified by 0, 1, 2, and 3, are possible symbol points defined upon a normalized, unit circle 64 defined with respect to the real and imaginary axes 66 and 68. During each transmission and for each transmit antenna, the symbol assign or 32 of the modulator 28 shown in FIG. 1 assigns encoder output symbols to one of the symbols 0–3 of the signal constellation set.

Codes are to satisfy the property that $D_{ec}{}^H D_{ec}$ is a diagonal matrix with equal non-zero values on the diagonal for any two codematrices c and e. This condition also ensures that the codeword difference matrix is of full rank (2 in this case).

The fact that the OC is realizable is quickly illustrated by use of the Radon-Hurwitz transform, via the submatrix construction:

$$C = \begin{pmatrix} C_a & C_{a+1} \\ -C^*_{b-1} & C_a \end{pmatrix},$$

That is, if in the case of one transmit antenna, an appropriate number of encoder output symbols would require that $C_n, C_{n+1}$ be transmitted in two consecutive symbol epochs, then, in the two antenna case, a first antenna 36-1 will transmit $C_n$ and $-C^*_{n+1}$ over two consecutive symbol epochs, and a second antenna 36-2 will transmit $C_{n+1}$, and $C^*_n$.

In this manner, codewords are formed over sub-frame lengths such that any two codewords in the code set satisfy the OC mentioned above, over the whole frame length. In this example, the sub-frame length is of a value 2. It can be shown that if the OC is satisfied over sub-frame lengths, then a code set regarded over the entire frame length, based on this design, will also satisfy the OC.

Following the above, codewords can now be looked at in two-epoch segments; equivalently, codematrices can be looked at in 2×2 submatrix blocks corresponding to two antennas and two time epochs, where each element of any code matrix would correspond to a point in a QPSK constellation. Hence, a total of $4^4$ (=256) codewords are possible in general. But all of these codewords do not satisfy the OC, while simultaneously attaining the maximum diversity level of two. Only 16 codewords (or codematrices) satisfy this property (it is important to note that the set is not unique). A particular set of 16 codewords (out of the many possible) is chosen to form the set S of codewords. It can be easily verified that, by construction, S satisfies the OC for any two codematrices. The elements of S shall be referred to as $C_0, C_1, \ldots C_{15}$ or simply by the subscripts when the context does not present any ambiguity. Also, note that the non-zero diagonal elements of $D_{ec}{}^H D_{ec}$ are also the eigenvalues of the matrix $D_{ec}{}^H D_{ec}$. Further, the sum of these eigenvalues is equal to the square of the Euclidian distance between the two codewords.

Thereby, a manner is provided by which to ensure best that the transmission of the signals generated during operation of the sending station 12 make efficient use of (1.) the forms of diversity present in the system through space and time redundancy and (2.) of the noise statistics. This maximum diversity better ensures that the information, when received at the receiving station 14, is recoverable.

Figure 3:
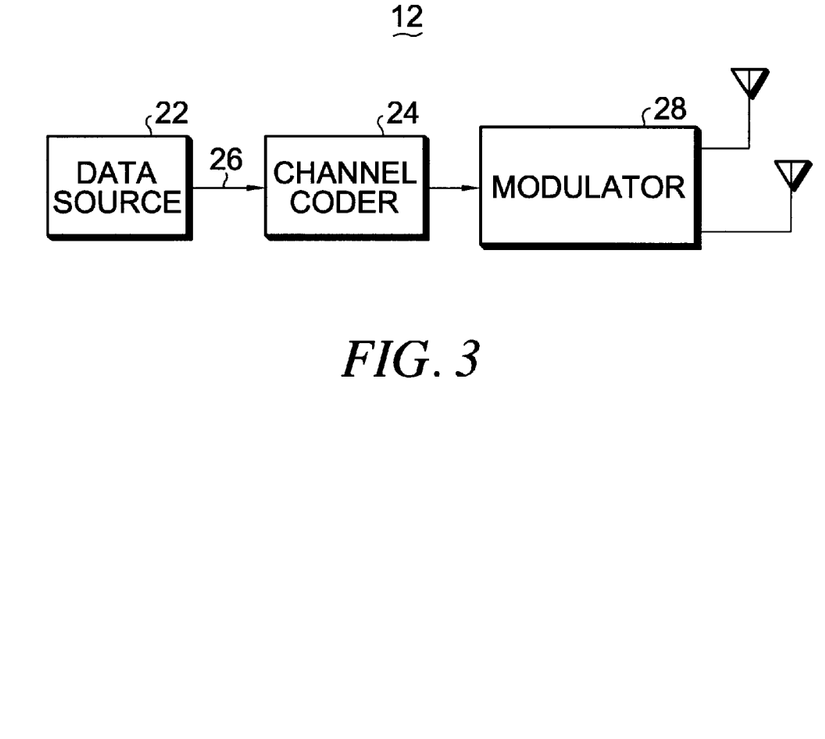
FIG. 3 illustrates a functional block diagram of a sending station of an embodiment of the present invention.

Turning next to FIG. 3, a sending station 12 of another embodiment of the present invention is shown. Analogous to the sending station 12 shown in FIG. 1, the sending station is here again shown to include a data source 22 and channel coder 24. The channel coder 24 again generates encoder output symbols on the line 26 which form data bits which are applied to the modulator 28. Here, the modulator 28 forms an Enhanced (modulator) Dimensionality Trellis Coded Modulator (EDTCM) according to an embodiment of the present invention. And, the modulator 28 is coupled to a multiple number of antennas, here a first antenna transducer 36-1 and a second antenna transducer 36-2.

The modulator 28 is operable pursuant to a TCM (Trellis Coded Modulation) scheme which performs coding of the data bits provided thereto on the line 26, modified in a manner to provide both spatial and time redundancy. The modulator is operable to accommodate transmit diversity provided by way of the antenna transducers 36-1 and 36-2. Additionally, the coding provided by the modulator behaves optimally in both fading and AWGN Additive White Gaussian Noise), while also achieving full transmit diversity and the maximum achievable modulator rate thereof. The scheme provided by this modulator lends itself to powerful extensions of turbo- and multi-level coding.

The Orthogonality Condition, also implemented in this embodiment via the Radon-Hurwitz construction, described previously, is again utilized. A set of all codematrices compliant with such Orthogonality Condition is defined to be a super-signal constellation which, in turn, describes the generalized, or enhanced, modulator. The modulator guarantees maximum diversity, has a maximum rate (in bits/s/Hz) that is achievable simultaneously with maximum transmit diversity. The modulator so-formed exhibits an inherent coding gain and can be regarded as a signal constellation of higher dimensionality. The relevant distance between the codematrices is a Euclidian distance.

In the exemplary implementation utilizing a two-antenna configuration and the construction of codematrices by the piece-wise concatenation of 2×2 matrices, each matrix corresponding to two antennas and two time epochs, with each element of the matrix corresponding to a point in a QPSK constellation. A total of $4^4$ (=256) codematrices are possible, in general. But, not all of the codematrices satisfy the diagonality requirement. By conducting a search of the possible codematrices, a determination is made as to which of the possible codematrices satisfy the diagonality requirement. Only sixteen of such possible codematrices satisfy the property, although the set is not unique. A particular set of sixteen codematrices, out of the many possible, is selected to form a set of S codematrices. The codematrices of the set coincide with the codematrices obtainable by way of the Radon-Hurwitz construction. By construction, therefore, S satisfies the diagonality requirement. The elements of S are, herein, referred to as $C_0, C_1, \ldots C_{15}$. The non-zero diagonal elements of the relevant product matrix are also eigenvalues of the product matrix. Additionally, the sum of such eigenvalues is equal to the Euclidian distance squared between the two elements of S.

Figure 4:
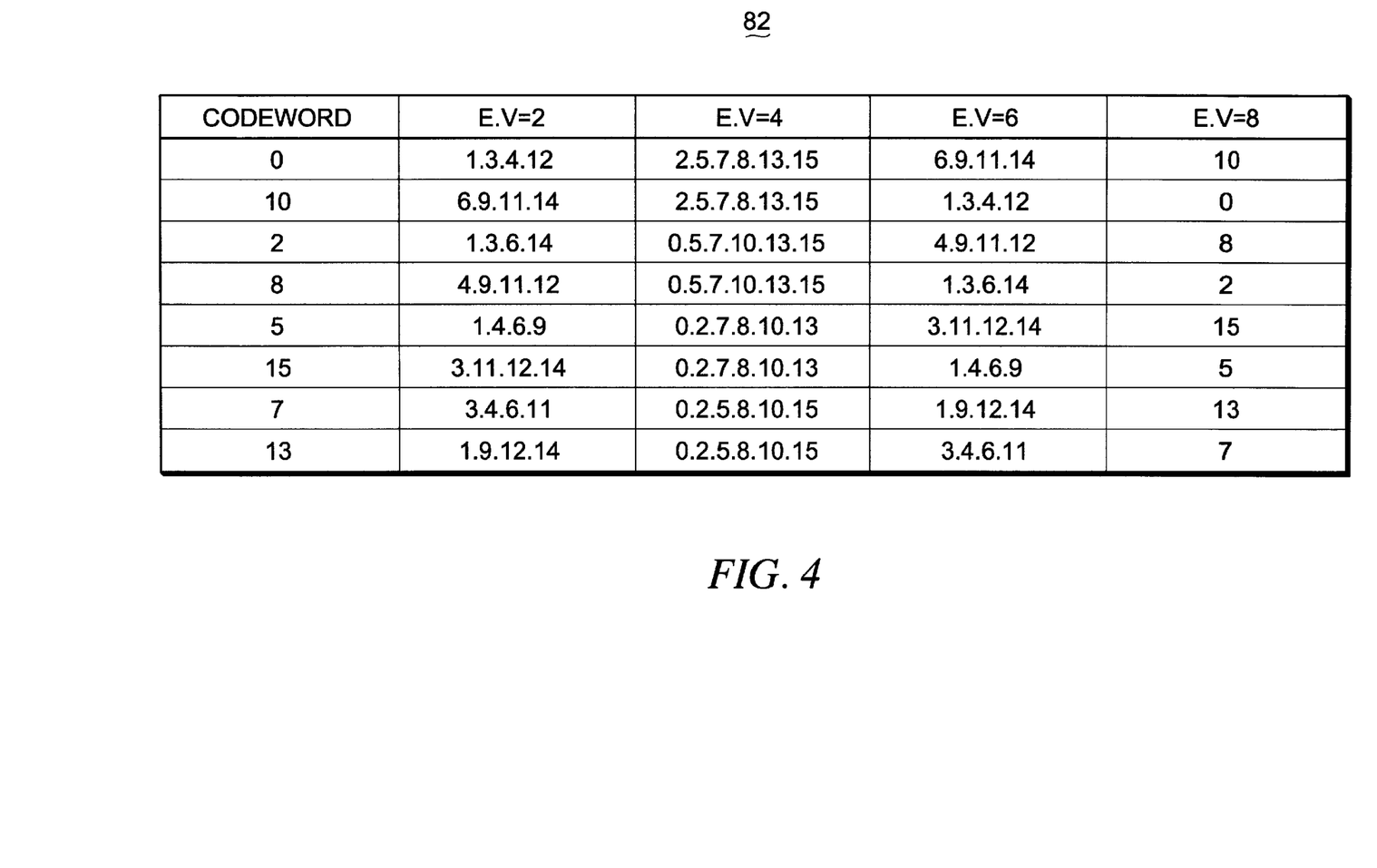
FIG. 4 illustrates a table listing all of the eigenvalues for different possible pairs of codewords selected as a result of operation of an embodiment of the present invention.
Figure 5:
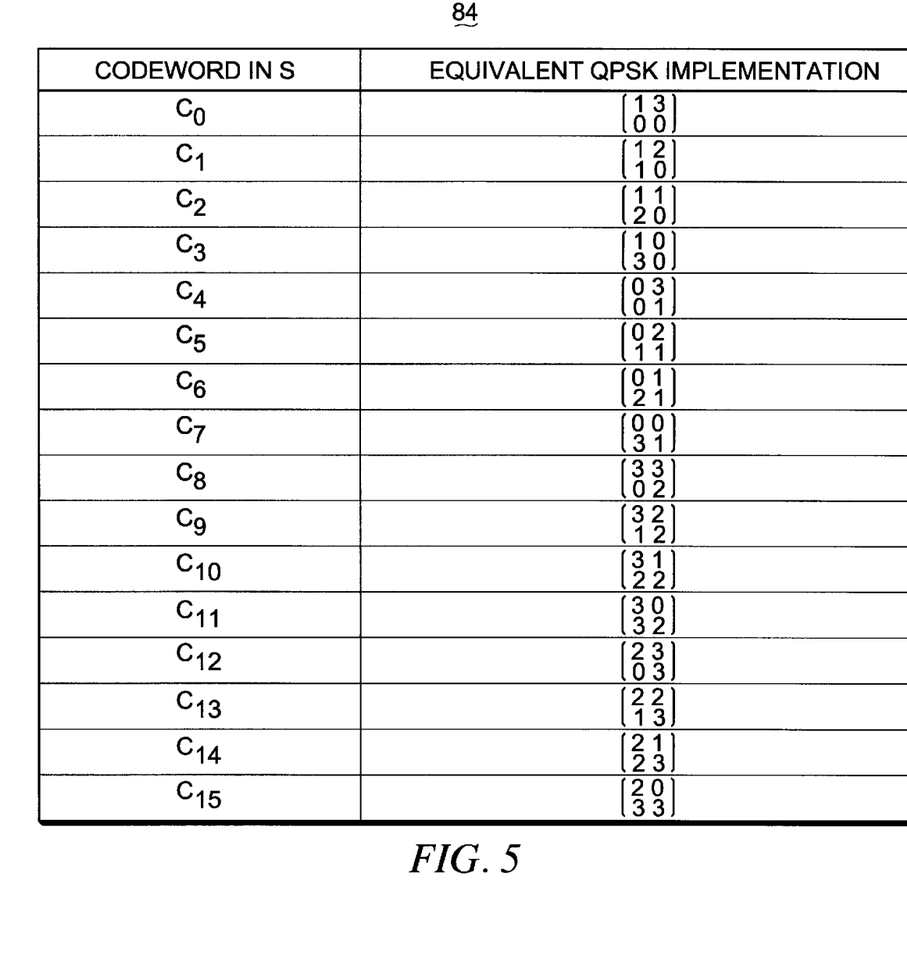
FIG. 5 illustrates a table representing specific implementations of various codewords defined through operation of an embodiment of the present invention.

FIG. 4 illustrates a table, shown generally at 82, which lists various possible eigenvalues (EV) for different possible choices of c, e in the set S, where c and e now refer to segments from some of the codewords the segments spanning the same two adjacent symbol epochs. And, FIG. 5 illustrates a table, shown generally at 84, of the codematrices selected to form the set S together with an equivalent QPSK implementation of the codematrice. The values of the equivalent QPSK implementation correspond to the designations used in FIG. 2. The subscripts designating each of the gcodematrice listed in the table 84 shown in FIG. 5 are identified as the entries shown in the various columns of the table 82 shown in FIG. 4.

The codewords listed in the first column of table 82 indicate only eight out of the sixteen possible codewords of the set S. Another table, analogous to the table 82, can be produced with respect to the other eight codewords of the set S.

Thereby, the set S is divided into two subsets S0 and S1 as follows: S0=[0, 10, 2, 8, 5, 15, 7, 13] and S1=[1, 11, 3, 9, 4, 14, 6, 12].

For any codeword in a subset S0 or S1, there are six other codewords within the same set which have an eigenvalue of four for the product matrix $D_{ec}{}^H D_{ec}$, and one codeword which has an eigenvalue of 8. Such one codeword is referred to as the complement of the given codeword. The cardinality of each of the subsets S0 and S1 is 8, and, for any codeword of one subset there are four codematrices and the other subset with which it produces has an eigenvalue of 2 for the relevent product matrix and an eigenvalue of 6 with the remaining codematrices in the other subset.

The modulation scheme provided by the modulator 28 whose signal set is given by the set S, that is, the transitions in a trellis defined by the modulator, are able to divide the elements of set S. Each element of the set S is, as indicated by the table 84 shown in FIG. 4, a matrix, here a 2×2 matrix, consisting of signal-point of a base modulation scheme, here a QPSK modulation scheme. The properties of the set S are utilized to construct a code which exhibits space and time diversity and is modeled, generally, on a modification of the TCM scheme, so as to accomodate multiple transmit antennas as well as space and time redundancy.

The Euclidian distance squared between two codematrices is proportional to the squared singular eigenvalues of the difference matrix, when the singular values are equal.

The input is an 8-ary symbol, and the output of the code is a 16-ary symbol. Thereby, the resultant coding is similar to a weight one-half TCM code designed for a Gaussian channel with the Euclidian metric, and a 16-ary constellation. The partitioning of the constellation is based upon the eigenvalues discussed above.

Figure 6:
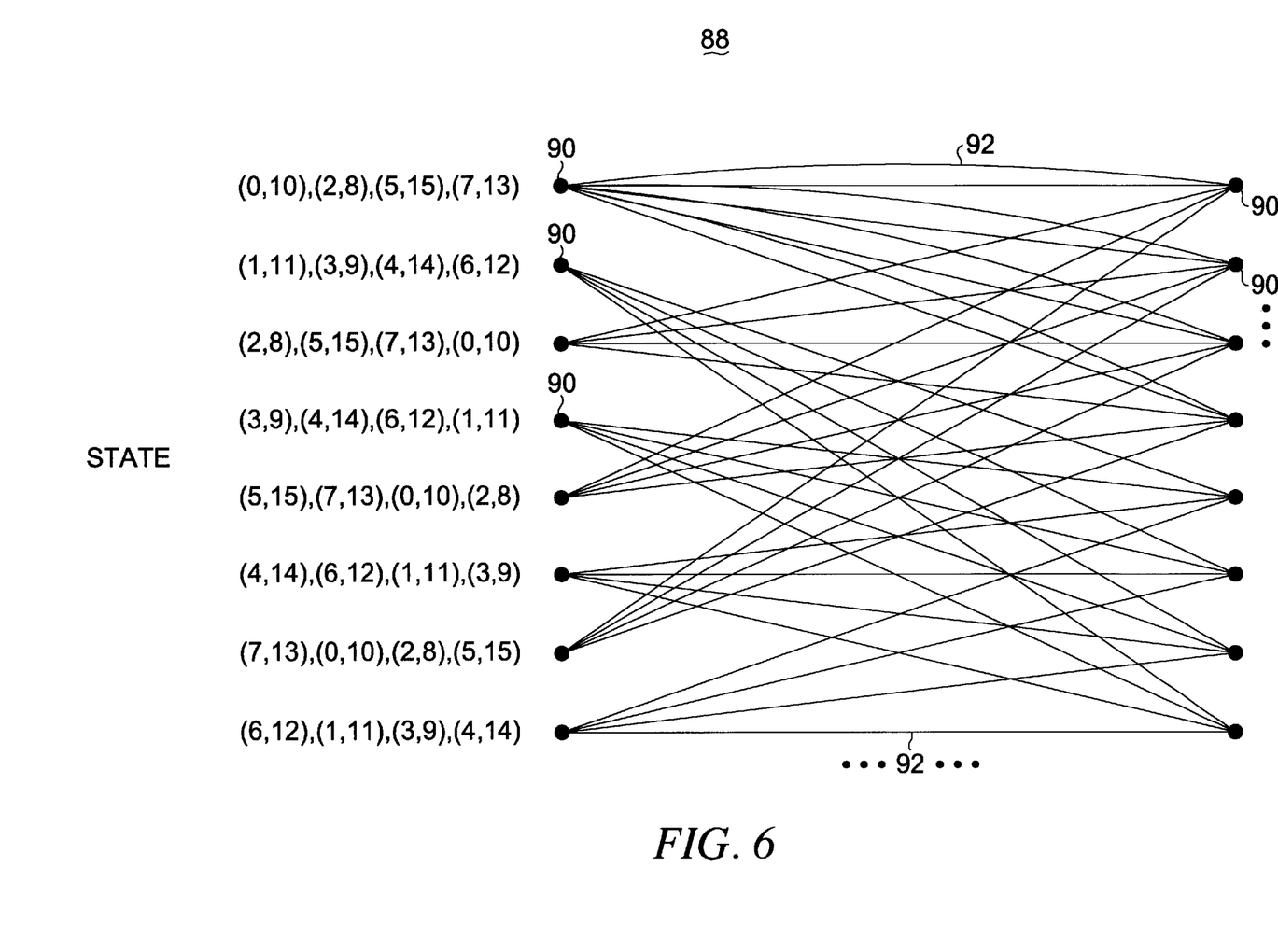
FIG. 6 illustrates a representation of a trellis forming the coding scheme implemented during operation of the modulator forming a portion of the sending station shown in FIG. 3.

FIG. 6 illustrates a trellis, shown generally at 88, which defines the code generated during operation of the modulator 28 shown in FIG. 3. The trellis can be implemented as a look-up table of a memory device. The trellis 88 is formed of a plurality of states 90 and a plurality of transition paths 92. Each state of the plurality of states 90 represents the last three input bits and symbols indicated within each set of parentheses corresponds to parallel transitions between the corresponding states joined by the corresponding trellis branch.

Each transition path 92 defines a parallel path, i.e., two paths. Hence, there are eight transitions from any state, hence the input to the code must be an 8-ary symbol, formed of three bits. And, the output of the trellis corresponds to the symbols of the set S which has a cardinality of 16. The rate of the code is ¾.

As noted previously, by construction, the codes exhibit the property of diagonality. Hence, the product matrix has equal eigenvalues. This is ensured for every branch in the trellis, and the eigenvalues become additive as the trellis is traversed. This, thereby, acts like the square of the Euclidian distance, which is the metric in a conventional AWGN channel.

The minimum Euclidian distance of the code is SQRT (16) equals 4 and occurs for the parallel transitions as well as for the error path of length two. Finally, the eigenvalues of the product matrix for any two codewords defined over the entire frame are the same, by construction.

With respect to the codewords of the set S, the table 84 represents the codematrices of S with entries from the basic QPSK constellation signals. Hence, for implementation, the trellis 88 is labeled in terms of such matrices, and the labels of the trellis 88 shown in FIG. 6 refer to the indices of the codematrices of the set S. Labels within brackets represent parallel transitions between the respective states.

More generally, codes designed for 8-PSK schemes could also be utilized in an alternate implementation. Since the same Orthogonal structure also stands for an 8-PSK scheme, the set S would exhibit a cardinality greater than or equal to 64. A multi-dimensional constellation, so-formed, would have 64 signal points, in contrast to the sixteen utilized in a QPSK-based constellation. The number of states in the trellis to achieve good minimum eigenvalues would correspondingly be higher.

The preferred descriptions are of preferred examples for implementing the invention, and the scope of the invention should not necessarily be limited by this description. The scope of the present invention is defined by the following claims.

I claim:

1. A method for providing transmit diversity to encoder output symbols formed by a channel encoder of a sending station to increase diversity levels thereof when communicated by a sending station upon a communication channel, said method comprising:

assigning each of the encoder output symbols formed by the channel encoder to an assigned symbol value, the assigned symbol value selected to achieve an orthogonality condition, the orthogonality condition satisfied when a Radon-Hurwitz-construction difference matrix, formed of any pair of codewords formed of sequences of the assigned symbol values multiplied together with a hermetian matrix thereof forms a diagonal matrix; and mapping individual ones of the assigned symbol values of the codewords to antenna transducers of a set of antenna transducers to be transduced therefrom.

2. The method of claim 1 further comprising the additional operation, subsequent to said operation of mapping, of transducing the codewords mapped during said operation of mapping into electromagnetic form.

3. The method of claim 2 wherein each assigned symbol value is a value of a QPSK (Quaternary Phase Shift Keying) constellation set.

4. The method of claim 4 wherein each Radon Hurwitz difference matrix comprises a 2×2 matrix formed of two rows of elements and two columns of elements.

5. The method of claim 3 wherein the QPSK constellation set is stored at a look-up table and wherein said method further comprises the operation of storing values of the QPSK constellation set at the look-up table.

6. An apparatus for providing transmit diversity to encoder output symbols formed by a channel encoder of a sending station to increase diversity levels thereof when communicated by a sending station upon a communication channel, said apparatus comprising:

an assignor adapted to receive the encoder output symbols formed by said channel encoder, said assignor for assigning each of the encoder output symbols formed by the channel encoder to an assigned symbol value, the assigned symbol value selected to achieve an orthogonality condition, the orthogonality condition satisfied when a Radon-Hurwitz-construction difference matrix, formed of any pair of codewords formed of sequences of the assigned symbol values multiplied together with a hermetian matrix thereof forms a diagonal matrix; and a mapper adapted to receive indications of assignations made by said assignations made by said assignor, said mapper for mapping individual ones of the assigned symbol values of the codewords to antenna transducers of a set of antenna transducers to be transduced therefrom.

* * * * *